UNITED STATES PATENT OFFICE.

FREDERIC P. DEWEY, OF WASHINGTON, DISTRICT OF COLUMBIA, ASSIGNOR TO THE CHEMICAL SUPPLY COMPANY, OF NEW YORK.

PROCESS OF OBTAINING ALUMINA AND ACETIC ACID.

SPECIFICATION forming part of Letters Patent No. 485,461, dated November 1, 1892.

Application filed April 9, 1890. Serial No. 347,264. (No specimens.)

*To all whom it may concern:*

Be it known that I, FREDERIC P. DEWEY, a citizen of the United States, residing at Washington, in the District of Columbia, have invented certain new and useful Improvements in Processes for the Production of Alumina and Acetic Acid, of which the following is a full, clear, and exact description.

The object of my invention is to provide a new process, by which alumina ($Al_2H_6O_6$) and acetic acid ($C_2H_4O_2$) may be produced in a single operation, both of which are articles of commerce and sought after. I do not, however, mean to imply that a failure to recover one of these substances would avoid the invention, as under certain circumstances it may be desired to produce the one by my process without saving the other. These substances have heretofore always been produced by different and separate operations; but by combining their production into a single operation great economy is secured.

Nearly all commercial alumina is now produced by decomposing a solution of aluminate of soda by passing a current of carbonic acid through the solution. This precipitates the alumina and transforms the soda into carbonate, which is recovered by a subsequent operation.

Acetic acid is produced in a variety of ways: first, by acetous fermentation; second, by oxidation of ethyl alcohol, and, third, by decomposing a soluble acetate by means of a stronger acid and then distilling this solution to separate the acetic acid. Glacial acetic acid has been produced by the destructive distillation of an acetate at elevated temperatures; but in such processes other volatile products are always given off besides acetic acid—notably acetone—while, on the other hand, the oxide or metal remaining at the conclusion of the operation is an element of cost in the process.

By my process I subject a solution of acetate of alumina to destructive distillation, driving off the acetic acid and precipitating the alumina. The acetic acid can be collected in a condenser or condensers and the alumina precipitated in the boiling-chamber recovered, thereby obtaining both commercial products.

The various steps entering into my invention, both for obtaining the acetate of alumina and its subsequent treatment, I will now proceed to describe.

I first take a soluble salt of alumina and dissolve it in water. I then mix this solution with the proper amount of a solution of an acetate, the base of which will form an insoluble combination with the acid that is combined with the alumina. Under these circumstances there will be an interchange of base—the acetate of alumina will remain in the solution while the insoluble salt will be precipitated. After separating the solution of acetate of alumina from the precipitate by any of the well-known methods it is subjected to destructive distillation by being heated to the boiling-point. Under these circumstances the acetate is gradually broken up, acetate acid is formed and driven off as a vapor, while the alumina separates and remains in the boiling-chamber. The precipitate that is first formed upon boiling the solution contains a portion of acetic acid. At the same time the solution in the boiling-chamber becomes acid and as long as it remains so will retain some of the alumina in solution. It is therefore necessary to continue the boiling for a considerable length of time. By this proceeding the free acid dissolved in the water is driven off. A further quantity of acetate is then decomposed, and the acid in the first precipitate formed is likewise driven off, so that finally all the acid is removed and there remains in the boiling-chamber only the hydrated alumina ($Al_2H_6O_6$) mixed with water. This alumina can be separated from the remaining water by any of the well-known processes of filtration or by boiling the solution down to dryness, as in some cases it is desirable to do. If now this boiling be carried on in an apparatus provided with suitable condensers, the acetic acid can be collected in these condensers and utilized. The length of time that the solution must be boiled to secure the complete decomposition of the acetate depends upon the strength of the original solution. I have found in practice that the stronger the solution the more rapid is the decomposition. Increase in the rate of decomposition also increases the strength of acid produced.

In carrying out my invention I prefer to use the sulphate of alumina and the acetate of lime, since these are both articles of ordinary commerce and can be obtained at low prices; but I do not limit myself to the use of either one of these salts. Operating with the salts mentioned I prefer to take a solution containing thirty-three per cent. or crystallized sulphate of alumina and a solution containing fifteen per cent. of the normal acetate of lime. On mixing these the sulphate of lime or gypsum will be precipitated and acetate of alumina will remain in solution. On boiling this solution of acetate of alumina in a suitable apparatus provided with a condenser a distillate will be obtained containing about 7.35 per cent. of acetic acid. In some cases this acid can be used direct, while for some purposes it is necessary to concentrate it. This can be accomplished in any of the well-known ways used for concentrating the acid produced by any other process. Other proportions may be used in preparing the solutions. I have even added one of the salts in the solid condition to the solution of the other salt; but the proportions given above are preferred. The acetate of lead can replace the acetate of lime in the above operation; but owing to its high cost it is not so economical.

What I claim as new and valuable is—

1. The process of manufacturing alumina and acetic acid by a single operation, which consists in subjecting a solution of acetate of alumina to destructive distillation, driving off the acetic acid as a vapor, collecting this acid in a condenser, and recovering the alumina precipitated in the boiling-chamber, substantially as described.

2. The herein-described process resulting in the manufacture of alumina, which consists in subjecting a solution of acetate of alumina to destructive distillation, driving off the acetic acid, and recovering the precipitated alumina, as set forth.

3. The herein-described process, which consists in subjecting a solution of acetate of alumina to destructive distillation, precipitating the alumina, driving off the acetic acid as a vapor, and collecting this acid in a condenser, as set forth.

4. The process of manufacturing alumina and acetic acid by a single operation, which consists in mixing a solution of a salt of alumina with a solution of an acetate the base of which will form an insoluble combination with the acid of the salt of alumina, separating the precipitate thus formed from the solution of acetate of alumina, subjecting this solution of acetate of alumina to destructive distillation, driving off the acetic acid as a vapor, collecting the acid in a condenser, and recovering the alumina precipitated in the boiling-chamber, substantially as described.

5. The process of manufacturing alumina and acetic acid, which consists in mixing a solution of sulphate of alumina with a solution of acetate of lime, separating the precipitate thus formed from the solution of acetate of alumina, subjecting the solution of acetate of alumina to destructive distillation, driving off the acetic acid as a vapor and collecting it in a condenser, and recovering the alumina precipitated in the boiling-chamber, substantially as described.

FREDERIC P. DEWEY.

Witnesses:
W. H. NEWHALL,
T. H. BROWN.